Figure 1:
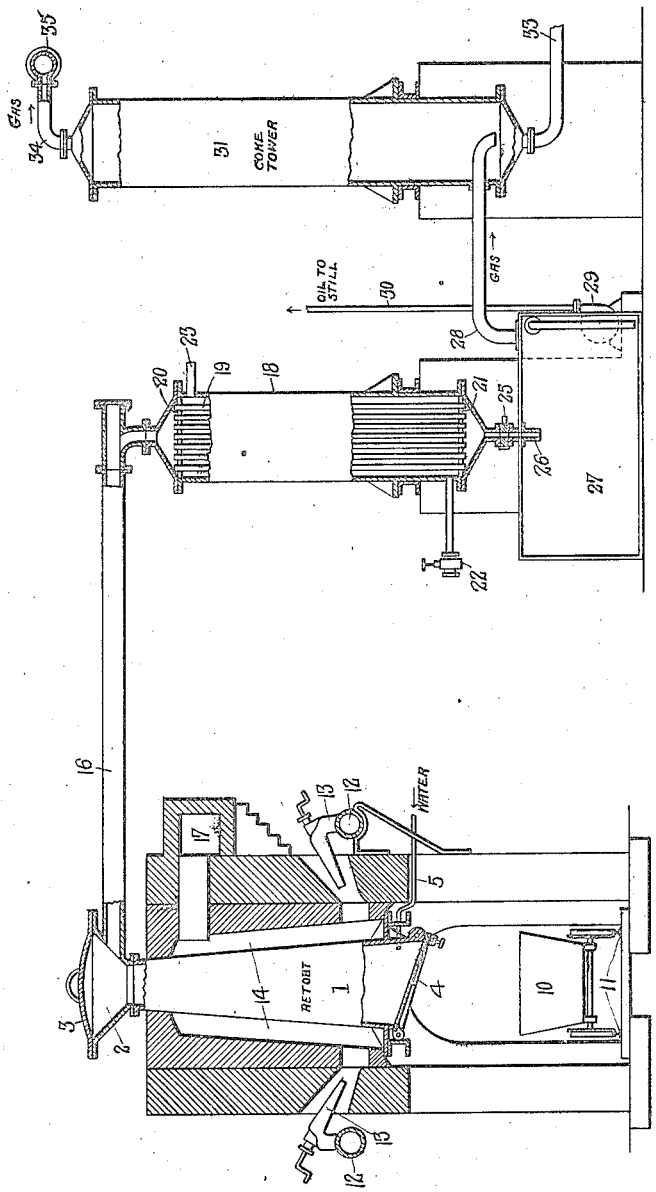

E. W. THURLOW.
METHOD OF OBTAINING MOTOR FUELS AND LIGHT PARAFFIN OILS FROM SHALE; AND BENZENE, TOLUENE, AND SOLVENT NAPHTHA FROM COAL.
APPLICATION FILED AUG. 28, 1917.

1,343,100.

Patented June 8, 1920.
2 SHEETS—SHEET 1.

INVENTOR
E. W. Thurlow.

By A. E. Parker
Attorney

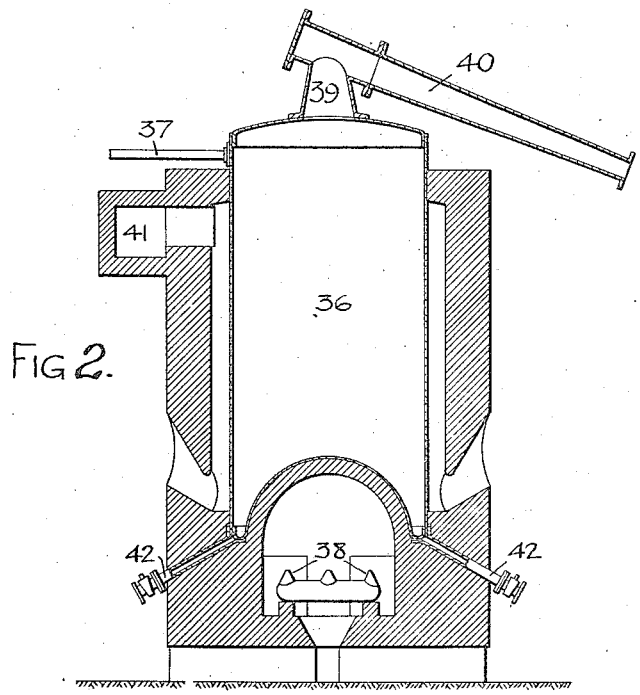
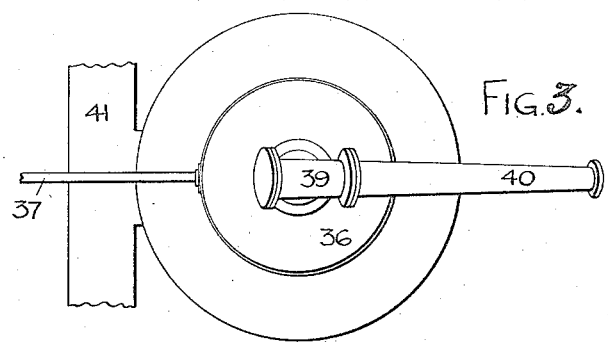

UNITED STATES PATENT OFFICE.

EDWARD WILLIAM THURLOW, OF BRIGHTON, VICTORIA, AUSTRALIA.

METHOD OF OBTAINING MOTOR-FUELS AND LIGHT PARAFFIN-OILS FROM SHALE; AND BENZENE, TOLUENE, AND SOLVENT NAPHTHA FROM COAL.

1,343,100.    Specification of Letters Patent.    Patented June 8, 1920.

Application filed August 28, 1917. Serial No. 188,633.

*To all whom it may concern:*

Be it known that I, EDWARD WILLIAM THURLOW, subject of the King of Great Britain, residing at No. 26 New street, Brighton, in the State of Victoria and Commonwealth of Australia, have invented an Improved Method of Obtaining Motor-Fuels and Light Paraffin-Oils from Shale; and Benzene, Toluene, and Solvent Naphtha from Coal, of which the following is a specification.

This invention is an improved method of obtaining motor fuels and light paraffin oils from shale, and benzene, toluene, and solvent naphtha from coal, which method consists essentially in the admixture with shale or coal, in the form of coarse powder, of some finely-ground material (such as limestone, dolomite, carbonate of magnesium, or barium carbonate), which, under the action of heat, will give off carbonic-acid gas. To this combination of materials is added small iron scrap, (such as iron turnings), or its chemical equivalent, for the purpose of causing the release of increased quantities of hydrogen. On the admixture being subjected to heat in a retort, the carbonic-acid gas given off from the carbonic-acid-gas-producing material acts as a carrier for the hydrocarbon vapors evolved from the shale or coal, and prevents them from becoming permanently fixed gases, while the action of the iron scrap, or its chemical equivalent, increases the volume of hydro-carbon vapors given off in the retort.

In preparing the mixture, the coal or shale and the carbonic-acid-gas-producing material are reduced to powder, the more finely pulverized the better, but I have found the most convenient and economic practice to be to grind the coal or shale so that it shall pass through a mesh of 64 to the inch, and the carbonic-acid-gas-producing material shall pass through a mesh of 400 to the inch. The proportions of carbonic-acid-gas-producing material and iron scrap, or its chemical equivalent, vary according to the amount of oxygen contained in the shale or coal. In practice I find that, with shale or coal containing from six to thirteen per cent. of oxygen, the admixture of from three to eight per cent. of carbonic-acid-gas-producing material, and from one and a half to four per cent. of iron scrap, or its chemical equivalent, gives the best results.

A sufficient quantity of the said admixture to constitute a charge is, when required, conveyed by any suitable means, such as elevator belts, and delivered into a traveling overhead skip, from which it passes through a hopper to a retort. The charge should be sufficient to occupy about two-thirds of the capacity of the retort, which, after being hermetically sealed, is slowly heated—preferably by producer gas—to temperatures ranging from 175° to 800° centigrade, according to the oils required to be obtained from the charge contained therein. The vapors evolved from the charge are conducted from the retort to any approved condenser, and condensed to crude oils. When the evolution of vapors in the retort ceases, the temperature is increased beyond 800°, and water, in the form of a fine mist or jet, is then injected into the lower part of the retort. The result is that further vapors are evolved, which are conducted as before to the condenser, and condensed into crude oils. The said crude oils pass from the condenser to a collecting tank below. The gases carrying vapors of light hydro-carbon liquids, coming from this tank pass to a coke or absorbing tower, the coke in which has been saturated with a suitable non-volatile oil, and in their passage through the coke therein, become condensed into oil of light specific gravity, which is recovered therefrom in the ordinary way. Any gas that escapes from the coke tower is diverted to, and stored in, a gasometer for heating, lighting, and power purposes. The crude oils in the collecting tank are withdrawn therefrom from time to time by means of a suction pump, and discharged into a still, where they are separated by fractional distillation, according to their different boiling points. The residual oils from the various distillations may be again subjected to destructive distillation in the retort. For this purpose they are mixed with fresh quantities of powdered carbonic-acid-gas-producing material, and iron scrap, or its chemical equivalent, and the mixture subjected to temperatures ranging from 175° to 800° centigrade, in the same manner as in dealing with the original charge. The quantities of the gas-producing material and iron scrap to be mixed with the residual oils vary as before from three to ten per cent. of carbonic-acid-gas-producing material, and from one and a half to four per cent. of iron scrap, or its equivalent, the best proportions being arrived at in this case by observation and adjustment in the course of the operation. I find the most effective mode of mixing the residual oils with the other materials mentioned is by running the oils in drops, or in a fine stream, upon a mixture of the other materials.

The vapors arising from this second destructive distillation of residual oils are conducted to and passed through a second retort exactly like the first, and at the same temperature, but charged to about half its capacity with manganese dioxid and iron scrap, or its chemical equivalent, preferably in the following proportions—viz., manganese dioxid one part, and iron scrap two parts. The effect of these last-mentioned materials is to enhance the production of condensable gases in the retort. The vapors given off are again condensed and fractionated according to the oil required. When no further oils are obtained at the condenser tail pipe, the operation of the retort is discontinued.

In the annexed sheets of drawings (in which the same reference numerals indicate the same parts wherever they occur) I have illustrated apparatus for carrying my improved method into effect.

Figure 1 is a vertical section of a plant suitable for the treatment of shale or other material in accordance with the process of the present application. Fig. 2 is a vertical sectional elevation of the still to which the crude oils from the collecting tank are pumped by means of the suction pump before referred to. Fig. 3 is a plan view of the still.

Referring now to Fig. 1: 1 is the retort, 2 the hopper at the top of said retort into which is fed the admixture of shale or coal, carbonic-acid-gas-producing material, and iron scrap, or its chemical equivalent, and from which said admixture falls into the said retort below. 3 is a removable cover for said hopper 2. 4 is a hinged discharge door at the bottom of the retort 1. 5 is a pipe for supplying water, in the form of a fine jet or mist, to the bottom of the retort. 10 is a truck running on rails 11. This truck is immediately below the hinged discharge door 4, and is for the purpose of removing the spent charge from the retort 1. 12 is a gas main in communication with a suction-gas-producing plant (not shown), and 13 are gas burners, several of which may be used in heating the retort. When the gas issuing from these burners is ignited, the heat generated passes into the flue 14 which surrounds the retort, and so heats same. 16 is a pipe for conveying the vapors generated in the retort 1 to the condenser. 17 is a flue through which the products of combustion pass from the space 14, around said retort, to a chimney (not shown).

18 is the condenser, consisting of a chamber containing a series of parallel vertical tubes 19. These tubes extend through a plate 20 at the upper end of the condenser 18, and through another plate 21 at the bottom thereof. 22 is a valve in the pipe through which the cooling medium enters the water chamber of condenser 18 and circulates around the tubes 19, passing out from the said water chamber through pipe 23. The gases and vapors from the retort 1 pass directly or indirectly into the upper end of the condenser 18, and from there travel downward through the tubes 19. In their passage through said tubes the vapors are condensed into crude oils, which pass through cock 25 and pipe 26 to the collecting tank 27 below. With the crude oils, a certain percentage of gases carrying vapors of light hydrocarbon liquids passes also into the said collecting tank, from which they are delivered by means of pipe 28 to a coke or absorbing tower hereinafter described. 29 is a pump by which the crude oils in the collecting tank 27 are delivered to pipe 30, which in turn delivers them to the still (Fig. 2), also hereinafter described.

31 is the coke tower into which the light gases from the collecting tank 27 pass through pipe 28 to the bottom of said coke tower, and, in their upward passage through the coke in said tower, a portion thereof becomes fixed into oils of light specific gravity which pass from the bottom of the tower through pipe 33. The balance of the gas escapes from the top of the coke tower, and passes by means of pipe 34 to gas main 35, which in turn delivers it to a gasometer (not shown) to be used for heating, lighting, and power purposes.

Referring now to Figs. 2 and 3, 36 is the still in which the crude oils are separated according to their various boiling points. The crude oils are delivered to the top of the still by means of pipe 37 in communication with pipe 30 (Fig. 1), and are subjected to heat from gas jets 38. As the said crude oils are distilled the vapors pass through hood 39 to the tail pipe 40, and thence to any well-known condensing apparatus (not shown), to be condensed to liquid products. 41 is a flue carrying to a chimney (not shown) the spent gases used in heating the still. 42 are pipes for drawing off the residuum from the still.

In cases where shale is treated for obtaining motor fuels and light paraffin oils therefrom, it is obvious that the shale being in the form of powder, the resultant coke is also in the form of powder. In that form it is useless as a fuel unless it is admixed with some binding material, such as tar or pitch, when it can be made up into briquets. If, however, the shale be supplied to the retort in small lumps instead of in a powdered condition, the coke produced is ready for the market without requiring any further treatment. This mode of treatment is only desirable when the resulting coke is of sufficient value in the market to compensate for the loss of motor fuels and light paraffin oils involved in not pulverizing the shale before treatment. Lumps to pass through a two-inch mesh are a very convenient size for the formation of coke.

What I claim is:—

1. In the process of obtaining motor fuels and light paraffin oils from shale, and benzene, toluene, and solvent naphtha from coal, the improvement which comprises mixing the shale or coal, in the form of powder, with some finely-powdered material, which, under the action of heat, will give off carbonic acid gas, and with finely divided metal which, when acted upon by steam, will cause the liberation of hydrogen, and subjecting the mixture to destructive distillation for the production of oil.

2. In the process of obtaining motor fuels and light paraffin oils from shale the improvement which comprises mixing the shale, in the form of small lumps, with some finely-divided material, which under the action of heat, will give off carbonic-acid gas, and with a finely divided metal, and subjecting the mixture to destructive distillation.

3. In a method of obtaining motor fuels and light paraffin oils from shale, and benzene, toluene, and solvent naphtha from coal, the admixture with the shale or coal in the form of powder, of a metal and some finely-powdered material, which, under the action of heat, will give off carbonic-acid gas, and thereafter heating the mixture.

4. Subjecting an admixture of coal or shale, in the form of powder, and some finely-powdered material, which, under the action of heat, give off carbonic-acid gas, together with small iron scrap, to heat in a retort, the heat varying according to the oils required to be obtained from the shale or coal, condensing the vapors given off to obtain crude oils.

5. In a method as described and claimed, treating the residual oils remaining from the various distillations by admixing them with a carbonic-acid-gas-producing material in a fine state of division, and finely divided metal, capable of aiding the liberation of hydrogen from steam, subjecting the same to heat in a retort, passing the vapors given off through another heated retort containing a charge of manganese dioxid and finely divided metal capable of aiding the liberation of hydrogen from steam, and condensing said vapors and collecting the oily product.

6. In the process of obtaining motor fuels and light paraffin oils from shale, and benzene, toluene, and solvent naphtha from coal, the improvement which comprises mixing the shale or coal, in the form of powder, with some finely-powdered material, which, under the action of heat, will give off carbonic acid gas, and with finely-divided metal, which, when acted upon by steam, will cause the liberation of hydrogen, and subjecting the mixture to destructive distillation for the production of oil, such heating being first carried to below 800° C., until the distillation of oil practically ceases, then heating the mass to a temperature above 800° C., while introducing moisture into the mass.

7. In the process of obtaining motor fuels and light paraffin oils from shale the improvement which comprises mixing the shale, in the form of small lumps, with some finely-divided material, which, under the action of heat, will give off a carbonic-acid gas, and with a finely-divided metal, and subjecting the mixture to destructive distillation, first at a temperature between 175° C., and 800° C., and when the distillation of oil has substantially ceased, further raising the temperature and introducing moisture into the mass.

8. In a method of obtaining motor fuels and light paraffin oils from shale, and benzene, toluene, and solvent naphtha from coal, the admixture with the shale or coal in the form of powder, of a metal and some finely-powdered material, which, under the action of heat, will give off carbonic-acid gas, and thereafter heating the mixture, first at a temperature between 175° C., and 800° C., and when the distillation of oil has substantially ceased, further raising the temperature and introducing moisture into the mass.

In testimony whereof I have affixed my signature in presence of two witnesses.

EDWARD WILLIAM THURLOW.

Witnesses:
WALTER S. BAYSTON,
RANK BAYSTON,